United States Patent [19]

Hongo et al.

[11] Patent Number: 4,628,533
[45] Date of Patent: Dec. 9, 1986

[54] PATTERN RECOGNITION APPARATUS

[75] Inventors: Yasuo Hongo; Yoshio Nitta, both of Tokyo, Japan

[73] Assignee: Fuji Electric Co., Ltd., Kanagawa, Japan

[21] Appl. No.: 573,810

[22] Filed: Jan. 25, 1984

[30] Foreign Application Priority Data

Jan. 26, 1983 [JP] Japan .................................. 58-9805

[51] Int. Cl.⁴ .............................................. G06K 9/62
[52] U.S. Cl. ......................................... 382/27; 382/30
[58] Field of Search ......................... 382/25, 27, 30, 34

[56] References Cited

U.S. PATENT DOCUMENTS

| | | |
|---|---|---|
| 3,104,372 | 9/1963 | Rabinow et al. |
| 3,178,688 | 4/1965 | Hill et al. |
| 3,576,534 | 4/1971 | Steinberger |
| 3,601,802 | 8/1971 | Nakagome et al. |
| 3,618,016 | 11/1971 | Steenis |
| 3,713,099 | 1/1973 | Hemstreet |
| 3,846,754 | 11/1974 | Oka et al. |
| 4,027,284 | 5/1977 | Hoshino et al. |
| 4,110,737 | 8/1978 | Fahey |
| 4,162,482 | 7/1979 | Su |
| 4,183,013 | 1/1980 | Agrawala et al. |
| 4,288,782 | 9/1981 | Bader et al. |
| 4,371,865 | 2/1983 | Moulton ............................... 382/27 |
| 4,398,256 | 8/1983 | Nussmeier et al. |

OTHER PUBLICATIONS

"Automatic Visual Sorting Method of Compressors with Stamped Marks" by A. Komura & K. Edamatsu, 1980 IEEE pp. 245-247.

"A Fast Interval Processor" by G. A. Shippey, R. J. H. Bayley, A. S. J. Farrow, D. R. Rutovitz and J. H. Tucker, MRC Clinical and Population Cytogenetics Unit, Edinburgh, U.K. (received for publication Dec. 22, 1980), Pattern Recognition vol. 14, Nos. 1-6, pp. 345-365, 1981).

"Portable Scanner Reads Handwritten Letters and Figures" by Douglas Glucroft, McGraw-Hill World News, Electronics/Apr. 7, 1981.

"Application of Random Pattern Recognition Technique to Quantative Evaluation of Automatic Visual Inspection Algorithms" by K. Edamatsu, A. Komuro and Y. Nitta, 1982 IEEE, pp. 139-143.

"Stamped Character Inspection Apparatus Based on the Bit Matrix Method" by Y. Hongo and A. Komuro, 1982 IEEE, pp. 448-450.

"Digital Pattern Recognition by Moments", in Optical Character Recognition by F. L. Alt edited by G. L. Fisher et al., Spartan Books, 1962, pp. 153-179.

"The RCA Multi-Font Reading Machine", i.b.i.d., pp. 3-14, by W. J. Hannan Radio Corporation of America, Defense Electronics Products.

"Electronics International-Portable Scanner Reads Handwritten Letters and Figures", by Douglas Glucroft, Mc-Hill World News, (*Electronics*, Apr. 7, 1981, pp. 81-82.)

*Primary Examiner*—Leo H. Boudreau
*Attorney, Agent, or Firm*—Brumbaugh, Graves, Donohue & Raymond

[57] ABSTRACT

In the particular embodiment of the invention described in the specification, a pattern recognition apparatus converts the signals received from a video pattern detector into a bit matrix comprising columns and rows of character elements. The matrix is divided into a series of blocks and the pressence of horizontal or vertical strings of bits is compared with corresponding bit information relating to a set of known characters. An unknown character is identified by a minimum deviation of the compared block information from that of a corresponding known character.

2 Claims, 20 Drawing Figures

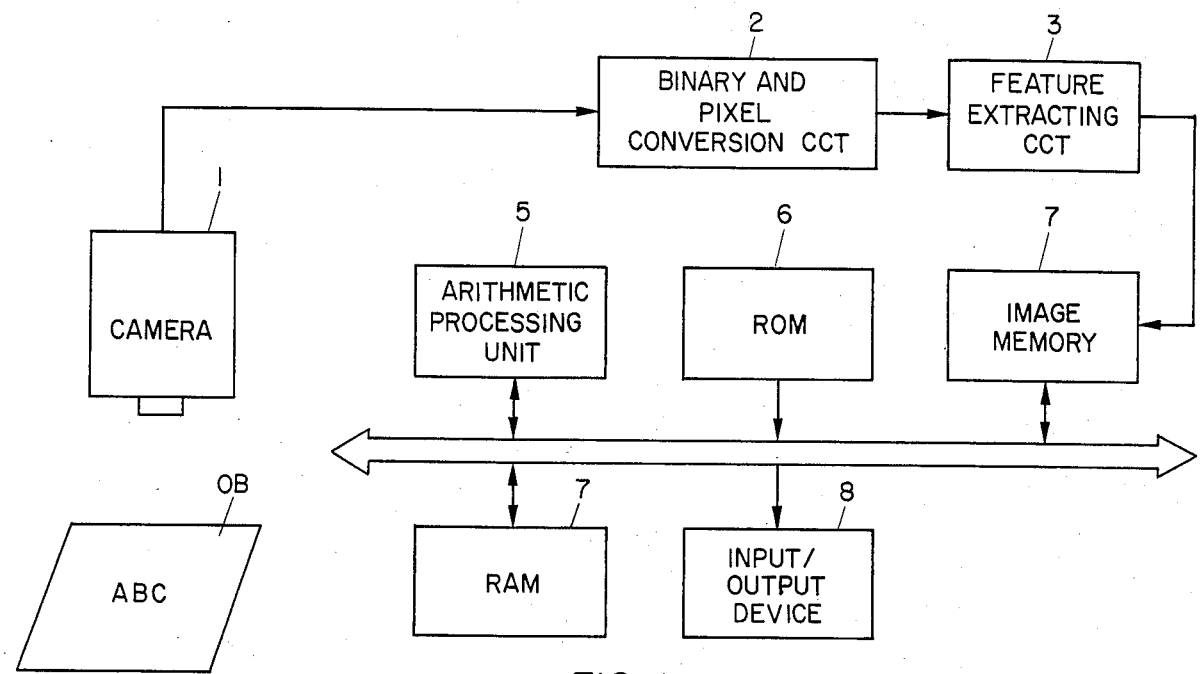
FIG. 1
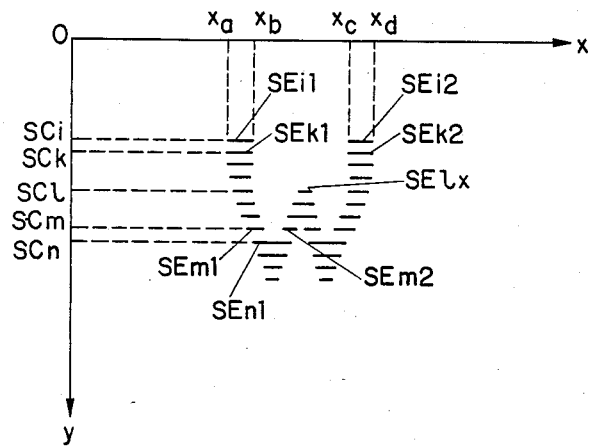
FIG. 2
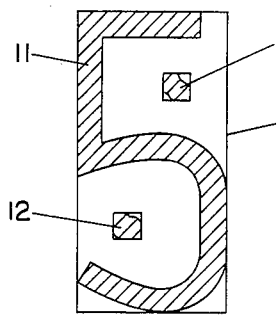 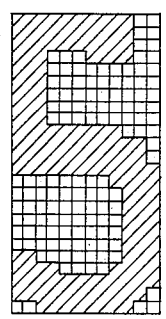 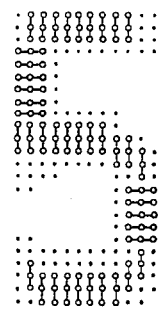
FIG. 3A     FIG. 3B     FIG. 3C

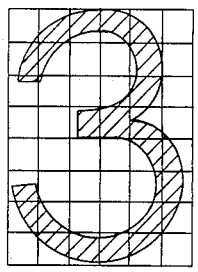
FIG. 4A  FIG. 4B
FIG. 4C  FIG. 4D  FIG. 4E
FIG. 4F  FIG. 4G
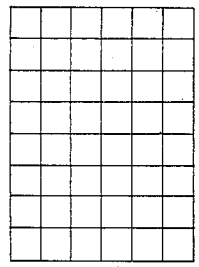
FIG. 4H  FIG. 4I

$B^K_H(k,l) \cdot B(k,l) \longrightarrow \Sigma B^K_H(k,l) \cdot B(k,l)$ $B^K_H(k,l) \qquad B(k,l) \qquad \Sigma B^K_H(k,l) \cdot B(k,l)$ (=0) (≠0) (≠0)

FIG. 5C

$D^K_H(B(k,l)) \quad B^K_H(k,l) \quad B(k,l) \quad D^K_H(B(k,l))$

FIG. 5D

$B(k,l) \cdot B(k,l) \longrightarrow \Sigma B(k,l) \cdot B(k,l)$ $B^K_V(k,l) \quad B(k,l) \quad \Sigma B^K_H(k,l) \cdot B(k,l)$

FIG. 5E

$D^K_V(B(k,l)) \quad B(k,l) \quad D^K_V(B(k,l))$

FIG. 5F

$B^K_S(k,l) \oplus \left[ B^K_M(k,l) \cdot \left\{ D^K_H(B(k,l)) + D^K_V(B(k,l)) \right\} \right]$ $B^K_S(k,l) \quad B^K_M(k,l) \quad D^K_H(B(k,l)) \quad D^K_V(B(k,l))$ $B^K_S(k,l) \quad B^K_M(k,l) \quad [D^K] \longrightarrow 1$

PATTERN RECOGNITION APPARATUS

BACKGROUND OF THE INVENTION

The present invention relates to a character or pattern recognition apparatus for recognizing characters or graphic patterns (hereinafter referred to as characters or character patterns) and, more particularly, to apparatus for recognizing characters through logic processing of video signals generated from the characters or character patterns by an image pickup device such as an industrial television (ITV) camera.

It is generally desirable that a pattern recognition apparatus be able to recognize characters and patterns at a high rate and accurately. One of the applicants herein has already proposed one type of such a character recognition apparatus in commonly owned, copending U.S. Application Ser. No. 504,263, now U.S. Pat. No. 4,556,985, issued on Dec. 3, 1985, which is incorporated herein by reference.

Such conventional processes, however, have suffered from the drawback that the arithmetic operation required to carry them out is highly complicated and time-consuming and is not suitable for processing by a microcomputer.

The present invention eliminates these disadvantages. It is an object of the present invention to provide a character recognition apparatus capable of processing data at higher speed.

SUMMARY OF THE INVENTION

In accordance with the invention, the deformation strings in a cluster of standard characters, as described hereinafter, are limited to the horizontal and vertical directions, and as described hereinafter, pattern elements are all made up of deformation elements so as to reduce the kinds of elements required to define a character recognition algorithm and a bit matrix or the like is divided into a prescribed number of blocks so that a deviation can be computed for each of the blocks to simplify and speed up the processing of data.

BRIEF DESCRIPTION OF THE DRAWINGS

An embodiment of the present invention will be described hereinafter, with references to the accompanying drawings, in which:

FIG. 1 is a block diagram showing the overall arrangement of a conventional character recognition apparatus;

FIG. 2 is a diagramatic illustration explaining the formation of a character from segmented information;

FIG. 3A is a diagram illustrating a typical character;

FIG. 3B is a diagram showing a bit matrix for the character of FIG. 3A;

FIG. 3C is a diagram showing a clustered expression of the character of FIG. 3A;

FIG. 4A is a diagram showing an unknown pattern to be recognized;

FIG. 4B shows the bit matrix for the character of FIG. 4A;

FIG. 4C is a diagram illustrative of a cluster of a given character;

FIGS. 4D-4G show a variety of bit matrices produced from the cluster of characters of FIG. 4C;

FIG. 4H is a diagram showing a representative matrix form for use in deriving bit matrices;

FIG. 4I is a diagram illustrating the division of bit matrices into blocks; and

FIGS. 5A-5F are sets of diagrams schematically illustrating a recognition algorithm according to the present invention.

Illustrated in FIG. 1 is a conventional solid-state image pickup device (hereinafter referred to as a "camera" in the form of an ITV camera, an MOS transistor or a CCD (charge-coupled device) 1, a binary and pixel conversion circuit 2, a feature extracting circuit 3, an image data storage circuit 4, an arithmetic processing unit 5, a ROM (read-only memory) type memory 6 chiefly for storing a program, a RAM (random-access memory) type memory 7 chiefly for storing data, and an input and output unit 8 containing a keyboard, a display and other elements, and a character or a character pattern OB to be recognized.

The character pattern is scanned by the camera 1 through repetitive scanning in a horizontal direction (x) while being vertically successively scanned in a direction (y). Time-series signals (video signals) generated by the camera are successively converted into binary values with a certain threshold level and divided into pixels (picture elements) with prescribed signals by the binary conversion circuit 2.

The image as represented by the pixels is schematically shown in FIG. 2. In this illustration, pixels representative of character patterns are expressed by a "1", pixels indicative of a background are expressed by a "0", and a series of horizontal pixels represented by "1" is called a segment. The character to be recognized can be divided into segments ($SE_{i1}$, $SE_{i2}$, ... $SE_{n1}$, ... ) on horizontal scanning lines $SC_i$ through $SC_n$ as shown in FIG. 2. The character can therefore be expressed by a cluster of such segments. In order to recognize that these segments belong to the same character, it is necessary to effect coordinate comparison for each segment. For example, when the current scanning line is $SC_k$, the segment $SE_{k1}$ on the current scanning line $SC_k$ can be judged as belonging to the same pattern as that to which the segment $SE_{i1}$ on the previous scanning line $SC_i$ belongs if the Y coordinate of the segment on the current scanning line $SC_k$ is different by one from that of the segment on the previous scanning line $SC_i$ and also if the X coordinates of the segments $SE_{i1}$, $SE_{k1}$ overlap each other at least partially.

For a clear understanding of the foregoing, each segment will be classified as a start segment or a joint segment, and an overlap pointer will be introduced. A start segment does not overlap any segment on the previous scanning line, the first segment of the corresponding character portion appears on the current scanning line. The start segments are indicated by $SE_{i1}$, $SE_{i2}$, $SE_{lx}$ in FIG. 2. A joint segment overlaps a segment appearing on the previous scanning line. The joint segments are indicated at $SE_{k1}$, $SE_{m1}$, $SE_{m2}$, for example, in FIG. 2. An overlap pointer represents information indicating that a segment on the current scanning line overlaps two or more segments on the previous scanning line. Overlap pointer information is represented, for example, in the segment $SE_{n1}$ in FIG. 2. These segments, or any segment with an overlap pointer, are considered as belonging to one "unit stroke" and each such segment is given a unit stroke number. By analyzing continuity between segments with unit stroke numbers, it is determined which unit stroke belongs to which "multistroke" or character pattern.

The feature extracting circuit 3 shown in FIG. 1 extracts, from segmented information, various features such as start segments, joint segments, overlap pointers, unit stroke numbers and the number thereof, segment lengths, and coordinates of the righthand ends of segments. The arithmetic processing unit 5 determines the width $W_C$ and height $H_C$ of a pattern expressed as a cluster of segments based on the data stored in the memory 4 and the program stored in the ROM 6. The arithmetic processing unit 5 judges an object pattern as a character, for instance, when $S_C$ defined by:

$$S_C = |W_C - W_A| + |H_C - H_A|$$

meets the condition $S_C \leq S_{CU}$, where $W_A$ and $H_A$ indicate the width and height, respectively, of a circumscribing frame or search frame of a predetermined size, and $S_{CU}$ a preset upper limit.

Data processed as a cluster of segments contain not only those indicative of a character 11 as shown in FIG. 3A, but also noises 12. Therefore, the circumscribing frame 13 is established and the foregoing arithmetic operation is carried out. Any pattern is therefore normalized in size by judging it as not being a character if its size is greater or smaller than the circumscribing frame 13 with a prescribed size.

After the pattern is thus defined in size, the circumscribing frame 13 is divided into 24×12 meshes, (generally m×n) for example, as shown in FIG. 3B. By assigning "1" or "0" dependent on whether there is at least one segment in each mesh, the object pattern can be expressed as 24×12 matrix. The matrix thus defined will hereinafter be called a "bit matrix". The bit matrix contains elements (bits) which are "1" or "0" at all times and elements which change to "0" or "1". A bit matrix for each of the standard character patterns is derived in advance by first framing the standard character pattern and dividing the frame into 24×12 meshes in the above-described manner and assigning a "1" or "0" to each mesh, depending respectively on whether or not a portion of the standard character pattern is present in the mesh. The bit matrix elements of the standard character pattern are then classified into the following four groups:

(a) pattern elements: elements which are "1" at all times;

(b) blank elements: elements which are "0" at all times;

(c) mask elements: elements which are variable between "1" and "0", i.e., the mask elements being preselected elements of the bit matrix of the standard character pattern that need not be considered ("don't care" elements) when calculating the deviation between an unknown character pattern and a standard character pattern, the mask elements being generally selected empirically either through experimentation or from prior knowledge of the general characteristics of the unknown character patterns; and, (d) deformation elements: elements constituting a deformation string (deformation class), a deformation string being a preselected string of elements representing the anticipated deformation or deviation of the unknown character from the corresponding standard character pattern, reference from the center line of the standard character pattern, caused by variations in the linewidth, contour, inclination etc. from the standard character pattern, the deformation strings being generally selected empirically either through experimentation or from prior knowledge of the general variations of the unknown characters formed by a particular process.

The standard character pattern corresponding to the bit matrix of an unknown pattern shown in FIG. 3B can be expressed as shown in FIG. 3C according to the above classification process. The symbols "o", "o-o-o", ".", and blank areas are indicative respectively of deformation elements, deformation strings (deformation classes) composed of such deformation elements, mask elements, and blank elements. The expression method as illustrated in FIG. 3C is called a cluster expression, and what is thus expressed is called a cluster of characters. The deformation strings are to be selected in crossing relation to a center line of a character even if the character inclination and line width are varied. FIG. 3C contains no pattern elements because all pattern elements are contained in the deformation elements.

For such a cluster of characters, a standard bit matrix $B_S^K$, a mask bit matrix $B_M^K$ and a deformation operator $D^K(B)$ acting on an unknown pattern B bit matrix are considered. The elements $B_S^K(i,j)$, $B_M^K(i,j)$, and $D^K(B(i,j))$ of the matrices $B_S^K$, $B_M^K$ and $D^K(B)$, respectively, are defined as follows:

$B_S^K(i,j)$: "1" when the element is a pattern element or a deformation element, and "0" when the element is another element;

$B_M^K(i,j)$: "0" when the element is a mask element and "1" when the element is another element;

$D^K(B(i,j))$: "1" when at least one of the elements of B corresponding to an element of a deformation string of $B_S^K$ containing $B_S^K(i,j)$ is "1" and remains unchanged, or otherwise, $B(i,j)$.

Using the quantities thus defined, a deviation of $D^K(B)$ between an unknown pattern bit matrix B and a standard or set character K is defined as follows:

$$D^K(B) = \sum_{i=1}^{M} \sum_{j=1}^{N} [B_S^K(i,j) \oplus \{B_M^K(i,j) \cdot (B(i,j))\}] \quad (1)$$

where "$\oplus$" indicates exlusive ORing, "." ANDing, and "$\Sigma$" arithmetic summation, and M, N magnitudes of matrixes. In this way, a set of deviations $\{D^K(B)\}$ can be determined for all characters K (which are indicated by symbols $VK \epsilon \Omega$) contained in the whole set $\Omega$ of characters. Then, the character $K_0$ having the minimum deviation value $D_1$ is determined according to equation (1) and the second smallest deviation $D_2$ is also determined. If these deviations meet the conditions:

$$D_1 \leq D_U$$

$$D_2 - D_1 \geq D_L \quad (2)$$

then the unknown pattern having a bit matrix B is judged as belonging to the character $K_0$. $D_U$ and $D_L$ are preset upper and lower limits, respectively, which are experimentally determined.

A circumscribing frame having a predetermined size, as described with reference to FIG. 3, is established for an unknown pattern, shown hatched in FIG. 4A, and is divided into 8×6 (M×N in general) meshes, for example. A "1" is assigned to those meshes where the pattern is present and "0" is assigned to those meshes where no pattern is present. This process produces a bit matrix B(i,j) of the unknown pattern, as illustrated in FIG. 4B. The whole set of characters to be recognized is represented by Ω and one particular character therein is represented by K.

A cluster expression of such a character K is as illustrated in FIG. 4C, in which the symbol "Δ" represents mask elements, no symbol represents blank elements, the symbol "o" deformation elements, and the symbols "o-o", "o" and "  o"
 |       |
 o     o—o represent deformation strings (deformation classes), which are called horizontal, vertical and mixed deformation strings, respectively. A mixed deformation string is composed of horizontal and vertical deformation strings crossing each other with one element interposed. The element where the horizontal and vertical deformation strings cross each other therefore contains a vertical deformation string as well as a horizontal deformation string. Any deformation string described in the prior art arrangements may extend obliquely with respect to the meshes of a matrix.

According to the present invention, however, deformation strings are limited only to the horizontal and vertical directions in order to simplify arithmetic operations. Further simplification is achieved in accordance with the invention by having all pattern elements, which are not mask elements contained in deformation strings. For such a cluster of characters, a horizontal deformation bit matrix $B_H^K(i,j)$, a vertical deformation bit matrix $B_V^K(i,j)$, a standard bit matrix $B_S^K(i,j)$ and a mask bit matrix $B_M^K(i,j)$ are defined as follows:

$B_H^K(i,j)$; "1" when the element is a horizontal deformation element, and "0" when the element is any other element;

$B_V^K(i,j)$; "1" when the element is a vertical deformation element, and "0" when the element is any other element;

$B_S^K(i,j)$; "1" when the element is either a horizontal or vertical deformation element, and "0" when the element is any other element; and $B_M^K(i,j)$; "0" when the element is a mask element, and "1" when the element is any other element.

From the foregoing it will be apparent that:

$$B_S^K = B_H^K + B_V^K$$

where "+" means ORing. The above bit matrices $B_H^K$, $B_V^K$, $B_S^K$, $B_M^K$ are shown in FIGS. 4D, 4E, 4F and 4G, respectively. These various bit matrices thus obtained are divided into blocks as shown in FIG. 4H, and the blocks are given block names $d_{11}^k$ through $d_{32}^k$ as shown in FIG. 4I. The division into blocks should be performed according to the following rules:

(a) Dividing lines for dividing the matrix into blocks shall not cross deformation elements; and (b) Two or more horizontal or vertical deformation strings (classes) shall not be present in one row or column when the matrix is divided into blocks.

For the whole set of characters, the division of a cluster of characters into blocks is not limited to one process, but can generally be carried out in a plurality of processes. FIG. 4H shows division into 3×2 blocks, but division into m×n blocks may be performed in general. Ordinary alphanumeric characters are sufficiently divided into blocks up to 4×4. Arithmetic processing is rendered easy when a unit of "8" is employed. Then, a deviation $D_{ij}^K(B)$ between an unknown pattern $B(k,l)$ and a standard pattern is computed according to the following equation for each block $d_{ij}^K$:

$$D_{ij}^K(B) = \Sigma B_S^K(k,l) \oplus [B_M^K(k,l) \cdot \{D_H^K(B(k,l)) + D_V^K(B(k,l))\}] \quad (3)$$

where $D_H^K(B(k,l))$ is an operation which is $B(k,l)$ when the value:

$$\Sigma B_H^K(k,l) \cdot B(k,l) \quad (4)$$

is "0", and which is $B(k,l) + B_H^K(k,l)$ when the above value is not "0". $D_V^K(k,l)$ can similarly be expressed by replacing "H" with "V", that is, it is an operation which is $B(k,l)$ when the value:

$$\Sigma B_V^K(k,l) \cdot B(k,l) \quad (5)$$

is "0", and which is $B(k,l) + B_V^K(k,l)$ when the above value is not "0". In the above expressions "$\oplus$" represents exclusive ORing, "." represents ANDing, and $(k,l)$ represents an element position of the block $d_{ij}^K$.

The manner in which the above arithmetic operations are effected specifically for each block will be described with reference to FIGS. 5A–5E which are illustrative of a computation example for the block given the block name $d_{12}^k$ in FIG. 4I and the corresponding portions in the various bit matrices are enclosed in square frames in FIGS. 4A–4G.

FIG. 5A shows the block $d_{12}^K$ of a bit matrix B of an unknown pattern. That block of the bit matrices and the corresponding block of the matrix $B_H^K$ are ANDed as shown in FIG. 5B to effect the arithmetic operation according to the formula (4), and the arithmetic summation ($\Sigma$) is performed for each row. Since the first row is "0" and the second and third rows are not "0", $B(k,l)$ is issued as the elements of the first row of the matrix block resulting from the operation of $D_H^K$ on the block $d_{12}^K$ of B, and $B(k,l) + B_H^K(k,l)$ is issued as the elements for the second and third rows of the matrix block resulting from the same operation.

While FIGS. 5B and 5C are illustrative of arithmetic operations for the block $d_{12}^K$ of the horizontal deformation bit matrix $B_H^K$, the same operations will be effected for the block $d_{12}^K$ of the vertical deformation bit matrix $B_V^K$. More specifically, the arithmetic operation according to the formula (5) is effected as shown in FIG. 5D, and $\Sigma B_V^K(k,l) \cdot B(k,l)$ is determined from the results. Since the rows as counted from the right are "0", "0", "≠0", respectively, $B(k,l)$ is issued as the elements for the rows for which formula (5) gives "0" and $B(k,l) + B_V^K(k,l)$ is issued as the elements for the rows for which formula (5) gives "≠0" in FIG. 5E.

In FIG. 5F, the arithmetic operation according to the equation (3) is effected on the results obtained by the steps shown in FIGS. 5C and 5E, and the standard per block and the mask bit matrix shown in FIGS. 4F and 4G to compute the deviation $D_{ij}^K(B)$ for block $d_{ij}^K$ between the unknown pattern and the standard pattern. The deviation is found to be "1" as is apparent from FIG. 5F.

By successively determining such a deviation for each block, the number of standard character pattern candidates can be reduced, and hence a character pattern can uniquely be determined after the operation has been performed a prescribed number of times. Therefore, the time required for deviation computation can be reduced as compared with the method in which arithmetic processing is effected without division of the matrix into blocks.

With the present invention, as described above, deformation strings are limited to two types, horizontal and vertical, and candidates for an object character are successively eliminated through arithmetic operations per block. This not only simplifies the arithmetic operation, but also greatly reduces the time required to carry out the arithmetic operation. Such processing can easily be performed in a known manner by practical application of a conventional 8-bit microcomputer.

The present invention can be used in the form of apparatus for recognizing engraved characters and simple figures which have heretofore been difficult to recognize.

We claim:

1. A pattern recognition apparatus comprising:
   (a) means for scanning an unknown pattern and providing a video signal corresponding to an image of the unknown pattern;
   (b) binary and pixel conversion means for dividing the image into an array of pixel elements and converting the video signals into binary values using a threshold level, each of the binary values corresponding to a respective one of the pixel elements;
   (c) feature extracting means for converting the binary values corresponding to the pixel elements into segment data corresponding to the image, the segment data being derived from segments of the image each consisting of a horizontal series of pixel elements having a first binary value;
   (d) memory means for storing the segment data corresponding to the image of the unknown pattern and data representing a plurality of standard patterns, the data representing each of the standard patterns comprising:
      (i) a standard bit matrix $B_S^K$ derived by dividing a framed image of the standard pattern into a specified array of meshes, each of the meshes corresponding to a resepctive element of the matrix $B_S^K$, each element of the matrix $B_S^K$ having the first or a second binary value depending respectively upon whether or not the element is preselected as a horizontal or vertical deformation element,
      (ii) a mask bit matrix $B_M^K$ having elements corresponding to respective ones of the meshes of the specified array, each element of the matrix $B_M^K$ having the second or the first binary value depending respectively upon whether or not the element is preselected as a mask element,
      (iii) a horizontal deformation bit matrix $B_H^K$ having elements corresponding to respctive ones of the meshes of the specified array, each element of the matrix $B_H^K$ having the first or the second binary value depending respectively upon whether or not the element is preselected as a horizontal deformation element, and
      (iv) a vertical deformation bit matrix $B_V^K$ having elements corresponding to the meshes of the specified array, each element of the matrix $B_V^K$ having the first or the second binary value depending respectively upon whether or not the element is preselected as a vertical deformation element;
   (e) arithmetic means for performing preprogrammed operations on the data stored in the memory means including:
      (i) means for comparing a width and a height of the unknown pattern with the width and height of a search frame,
      (ii) means for framing the image of the unknown pattern and dividing the framed image into the specified array of meshes and deriving a bit matrix B of the image having elements corresponding to respective ones of the meshes of the specified array, each element of the matrix B having the first or the second binary value depending respectively upon whether or not a segment of the image of the unknown pattern is present in the corresponding mesh,
      (iii) means for matching the unknown pattern to one of the standard patterns by computing the deviation $D^K(B)$ between the unknown pattern and each one of the standard patterns, the deviation $D^K(B)$ being computed by performing a prescribed operation on at least a corresponding block of the matrix B and the matrices $B_S^K$, $B_M^K$, $B_H^K$ and $B_V^K$ representing each one of the standard patterns wherein the prescribed operation is defined as $$D_{ij}^K(B) = \Sigma B_S^K(k,l) \oplus [B_M^K(k,l) \cdot \{D_H^K(B(k,l)) + D_V^K(B(K,l))\}]$$

where $D_H^K(B(k,l)) = B(k,l)$ if $\Sigma B_H^K(k,l)B(k,l) = 0$, $D_H^K(B(k,l)) = B(k,l) + B_H^K(k,l)$ if $\Sigma B_H^K(k,l)B(k,l) \neq 0$, $D_V^K(B(k,l)) = B(k,l)$ if $\Sigma B_V^K(k,l)B(k,l) = 0$, $D_V^K(B(k,l)) = B(k,l) + B_V^K(k,l)$ if $\Sigma B_V^K(k,l)B(k,l) \neq 0$.

2. A pattern recognition apparatus according to claim 1, wherein the prescribed operation is performed to identify one of the standard patterns providing the smallest deviation $D_1$ and another one of the standard patterns providing the second smallest deviation $D_2$ and wherein the unknown pattern is matched to the one of the standard patterns providing the smallest deviation $D_1$, if $D_1$ and $D_2$ satisfy the criteria $D_1 \leq D_U$ and $D_2 - D_1 \geq D_L$, where $D_U$ and $D_L$ are predetermined limits.

* * * * *